United States Patent
Baig et al.

(10) Patent No.: US 11,526,569 B2
(45) Date of Patent: Dec. 13, 2022

(54) GENERATING DIRECTIONS AND ROUTES WITH PERSONALIZED LANDMARKS

(71) Applicant: Google LLC, Mountain View, CA (US)

(72) Inventors: Haroon Baig, Zurich (CH); Ankit Gupta, Zurich (CH)

(73) Assignee: Google LLC, Mountain View, CA (US)

( * ) Notice: Subject to any disclaimer, the term of this patent is extended or adjusted under 35 U.S.C. 154(b) by 85 days.

(21) Appl. No.: 16/488,514

(22) PCT Filed: Aug. 24, 2018

(86) PCT No.: PCT/US2018/047900
§ 371 (c)(1),
(2) Date: Aug. 23, 2019

(87) PCT Pub. No.: WO2020/040782
PCT Pub. Date: Feb. 27, 2020

(65) Prior Publication Data
US 2020/0250251 A1    Aug. 6, 2020

(51) Int. Cl.
G06F 16/9537    (2019.01)
G06F 16/9535    (2019.01)

(52) U.S. Cl.
CPC ...... *G06F 16/9537* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 9,424,342 B1 * | 8/2016 | Ravichandran | G06F 16/9537 |
| 9,618,354 B2 * | 4/2017 | Tseng | G01C 21/3644 |
| 2003/0060978 A1 * | 3/2003 | Kokojima | G01C 21/20 |
| | | | 701/434 |
| 2008/0256044 A1 | 10/2008 | Anderson et al. | |
| 2009/0143984 A1 | 6/2009 | Baudisch et al. | |

(Continued)

OTHER PUBLICATIONS

Yerva et al., "TripEneer: User-Based Travel Plan Recommendation Application," Proceedings of the Seventh International AAAI Conference on Weblogs and Social Media, 2013, 2 pages.

(Continued)

*Primary Examiner* — Christopher J Raab
(74) *Attorney, Agent, or Firm* — Lerner, David, Littenberg, Krumholz & Mentlik, LLP

(57) ABSTRACT

Aspects of the technology evaluate places that are familiar to a given user in order to provide contextualized location information about other places of interest. This may include evaluating the actual number of visits by the given user to one or more locations in a given geographical area. For instance, places that have been visited a sufficient number of times within a particular timeframe are identified as personal landmarks for that user. Thus, when the user searches for a specific place or otherwise requests results that fit a query, the system can use the personalized landmark information to help rank search results and to provide location cues to aid the user to quickly and efficiently arrive at the location of the search result. Personal landmarks are necessarily familiar to the user, and thus can reduce the number of turn-by-turn directions or simplify the graphical interface of the client device.

13 Claims, 9 Drawing Sheets

(56) References Cited

U.S. PATENT DOCUMENTS

| | | | | |
|---|---|---|---|---|
| 2010/0217525 | A1* | 8/2010 | King | G06Q 30/0259 |
| | | | | 705/14.57 |
| 2011/0093458 | A1* | 4/2011 | Zheng | G06F 17/30589 |
| | | | | 707/724 |
| 2013/0103697 | A1* | 4/2013 | Hill | G06F 16/9537 |
| | | | | 707/748 |
| 2013/0304383 | A1* | 11/2013 | Bageshwar | G01C 21/20 |
| | | | | 701/534 |
| 2014/0214427 | A1* | 7/2014 | Chao | G10L 15/22 |
| | | | | 704/270.1 |
| 2015/0199380 | A1* | 7/2015 | Avramova | G06F 16/9537 |
| | | | | 707/738 |
| 2015/0253143 | A1 | 9/2015 | Bailiang et al. | |
| 2016/0216131 | A1* | 7/2016 | Khorana | G01C 21/3644 |
| 2018/0136001 | A1* | 5/2018 | Ishikawa | G01C 21/32 |

OTHER PUBLICATIONS

Shen et al., "The Evolution of Research on Multimedia Travel Guide Search and Recommender Systems,"Singapore Management University Institutional Knowledge at Singapore Management University, Nov. 2014, 13 pages.

Lu et al., "Photo2Trip: Generating Travel Routes from Geo-Tagged Photos for Trip Planning," MM'10, Oct. 25-29, 2010, Firenze, Italy, 10 pages.

Jiang et al,"Personalized Travel Sequence Recommendation on Multi-Source Big Social Media," IEEE Transactions on Big Data, vol. 2, No. 1, Jan.-Mar. 2016, 14 pages.

Shi et al., "Personalized Landmark Recommendation Based on Geotags from Photo Sharing Sites," Proceedings of the Fifth International AAAI Conference on Weblogs and Social Media, 2011, 4 pages.

Muller et al., "Exploring factors that influence the combined use of mobile devices and public displays for pedestrian navigation," ACM, 2008, 10 pages.

Sandhyarani et al., "Feasible Route Search on RoadNetworks by Using Clues," IJSRST, vol. 4, Issue 5, 2018, 6 pages.

International Search Report and Written Opinion for International Application No. PCT/US2018/047900 dated May 9, 2019. 16 pages.

International Preliminary Report on Patentability for International Application No. PCT/US2018/047900 dated Mar. 11, 2021. 11 pages.

Examination Report for European Patent Application No. 18769001.1 dated Nov. 6, 2020. 9 pages.

First Examination Report for Indian Patent Application No. 202027046865 dated Sep. 17, 2021. 8 pages.

* cited by examiner

- Head north on the 101 towards San Francisco
- Take the Mission Street exit
- Drive past Extreme Kobe Burger
- Make a left onto Pine Street
- Go to Uncle Jim's and make a left
- Turn right on Laguna Street
- Your destination is across from your barber shop

GENERATING DIRECTIONS AND ROUTES WITH PERSONALIZED LANDMARKS

CROSS-REFERENCE TO RELATED APPLICATION

This application is a national phase entry under 35 U.S.C. § 371 of International Application No.: PCT/US2018/047900, filed on Aug. 24, 2018, the entire disclosure of which is incorporated herein by reference.

BACKGROUND

Map and navigation-type applications are able to provide street addresses, as well as indicate the position of a point of interest, within a geographic region. This information can be presented to a user on a display device. However, that information may be of little relevance to the user if he or she is not familiar with the area being displayed and may thus lead to the user not being able to efficiently carry out his/her task. For instance, the user may be new to a city. If he or she submits a query for restaurants or other places of interest in the city, the application may return results with a street address or a map with a pin in it. Unfortunately, this information may be unhelpful or may actually confuse the user about where to go or how to get there. A more robust approach that provides contextual information would be more useful to the user and would provide for an improved interaction between the user and the device from which the contextual information is presented.

BRIEF SUMMARY

Aspects of the technology focus on places that are familiar to a user in order to provide relevant personalized location information. While famous landmarks can be used to orient the user when viewing a map or reading directions, returning results in relation to somewhere that is personally familiar to the user would be more likely to help the user. Such landmarks can provide contextual suggestions or other cues to help orient the user when viewing the results on a map, and can aid the user in efficiently getting to a particular place of interest through an interaction with his or her computing device. For instance, the use of landmarks with which a user is personally familiar can streamline the turn-by-turn directions that would otherwise need to be provided to the user. This is one example of how aspects of the technology can provide a discriminating approach to selecting particular information for provision to a user from a computing device. Aspects of the technology may reduce the density of information displayed on a screen of such a device and make the selected displayed information more visible to the user, for example by drawing the user's attention to landmarks and places of interest in the information displayed on the screen.

According to one aspect, a computer-implemented method is provided. The method includes obtaining, by one or more processors, a search request for a given geographical region in accordance with a client query at a client device; obtaining, by the one or more processors, one or more search results for the search request, the one or more search results corresponding to one or more places of interest in the given geographical region; and identifying, by the one or more processors, one or more personalized landmarks in the given geographical region, the personalized landmarks being associated with a user of the client device. The method also includes selecting, by the one or more processors, at least one of the personalized landmarks meeting a physical location criteria in relation to a given one of the one or more places of interest; and generating by the one or more processors, for presentation by the client device, at least one of textual, audible or visual information to guide the user of the client device from the at least one personalized landmark to the given place of interest.

In one example, the one or more personalized landmarks are personally familiar areas or personally familiar points of interest for the user determined in accordance with one or more prior actions by the user. The one or more prior actions may include visiting the personally familiar areas or personally familiar points of interest a minimum number of times within a given timeframe. The personalized landmarks may be at geographical locations previously visited by the user. The associations between the user and the personalized landmarks may comprise data, stored in computer memory, indicative of the user having previously visited the personalized landmarks.

The physical location criteria may be either a predetermined physical distance or a line of sight between a particular personalized landmark and the given place of interest. Generating the at least one of textual, audible or visual information may include fuzzing information about the at least one personalized landmark. Selecting at least one of the personalized landmarks to meet the physical location criteria may include evaluating a current viewport of the client device. Evaluating the current viewport of the client device may comprise determining that a map displayed in the current viewport includes a location of the selected personalized landmark.

The computer-implemented method may further comprise applying data identifying the identified one or more personalized landmarks as a ranking signal to select a subset of search results to present in response to the search request. The computer-implemented method may further comprise determining whether locations of any of the personalized landmarks fall within a geographical area displayed within current viewport of the client device. The determining whether locations of any of the personalized landmarks fall within the geographical area displayed within the current viewport of the client device may be performed prior to obtaining the search request.

The selection of at least one of the personalized landmarks may be based on at least one or more of an amount of prior visits to the particular personalized landmark, and an ease of accessibility between the particular personalized landmark and the place of interest. And the visual information may be other, non-textual, visual information.

Another aspect is directed to a system configured to carry out the method as described above. A further aspect is directed to computer-readable instructions, which when executed by a computing apparatus, cause the method as described above to be performed. Yet another aspect is directed to a non-transitory computer-readable recording medium having instructions stored thereon. The instructions, when executed by one or more processors, cause the one or more processors to execute the method as described above.

Yet another aspect provides a client device. The client device includes a user interface module including one or more user input devices configured to receive user input; a processing module including one or more processors; a memory module having one or more memories configured to store data and instructions for execution by the processing module; and a communication module including a wireless transceiver configured for bidirectional communication with one or more remote devices. The processing module is operatively coupled to the user interface module, memory module and the communication module. The processing module is configured to obtain a search request for a given geographical region in accordance with a client query at a client device; obtain one or more search results for the search request, the one or more search results corresponding to one or more places of interest in the given geographical region; identify one or more personalized landmarks in the given geographical region, the personalized landmarks being associated with a user of the client device; select at least one of the personalized landmarks meeting a physical location criteria in relation to a given one of the one or more places of interest; and generate for presentation by the client device, at least one of textual, audible or other visual information to guide the user of the client device from the at least one personalized landmark to the given place of interest.

Still a further aspect provides a client device, comprising a user interface module including one or more user input devices configured to receive user input; a processing module including one or more processors; a memory module having one or more memories configured to store data and instructions for execution by the processing module; and a communication module including a wireless transceiver configured for bidirectional communication with one or more remote devices. The processing module is operatively coupled to the user interface module, memory module and the communication module, and the processing module is configured to perform the method as described above.

BRIEF DESCRIPTION OF THE DRAWINGS

Accompanying this specification is a set of drawings illustrating various features and aspects of the technology. In the drawings, like reference numerals refer to like elements. A brief discussion of each drawing is provided below.

Figure 1:
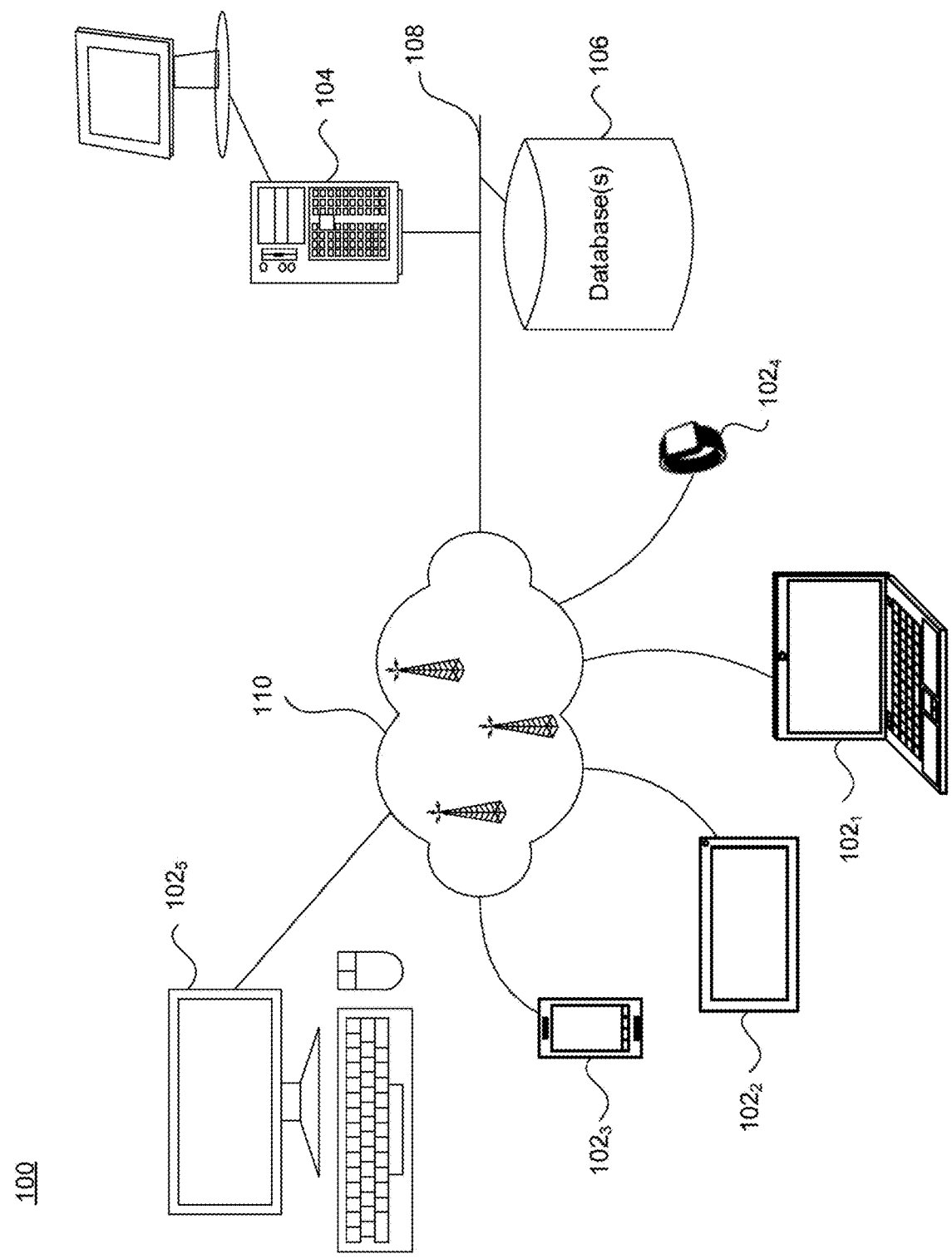
FIG. 1 illustrates an example network in accordance with aspects of the disclosure.

The following description is based on embodiments of the claims and should not be taken as limiting the claims with regard to alternative embodiments that are not explicitly described herein.

DETAILED DESCRIPTION

Overview

Using contextual landmark information in response to a search query, to provide driving (or walking) directions, or to highlight routes on a map, enables users to quickly and easily orient themselves in relation to a place of interest. One way to do this is to look for famous places that include the top N places visited within a city by many people. The number N of top places visited may be, for example, 1-3 places, no more than 5 places, up to 10 places, etc. It is also possible to look at the places visited via location history or places queried in search requests, and aggregate that information across many users. Here, the top visited places could be evaluated to decide whether they should be given a status of a "famous" (or popular) landmark Another approach is to evaluate the place visits for a given user. For instance, places that have been visited more than X times (e.g., 5 times) within a predetermined period of time (e.g., 1 year, 3 months, within the last week) can be identified as "personal" landmarks for the given user.

Once the personalized or famous landmarks have been determined, search results associated with particular locations would be presented to the user in relation to the proximity of one (or more) such landmark(s). If a result is already familiar to a user, for instance due to prior in-person visits, it is unnecessary to explain where that result is located. But if a result is new to a user (e.g., a new restaurant or store), and there is a relevant landmark nearby, the location of the result or directions to the result are presented by a device (e.g., textually, orally, visually and/or via haptic/tactile feedback) based on proximity to the landmark. For instance, this may be done by using the device to instruct the user to drive (or walk) towards the personalized landmark, make a right, go 2 blocks, and the place of interest (i.e. the location associated with the search result) will then be located on the left side of the street. In doing so, the density of information which is presented by the device to the user in order to allow the user to efficiently navigate to the location of interest is reduced relative to, for example, a full set of turn-by-turn instructions from e.g., the user's current location. A discriminating approach is used to select particular information, including the personalized landmark, which, once displayed or otherwise output to the user from his/her device at the relatively low information density facilitated by the discrimination, allows the user to effectively interact with the device to move to the location of interest. In examples where the information is displayed on a screen the device, the low density of the information may allow the landmark and location of interest to be highly visible to the user. This may be at least in part because the scope for such items of information being undesirably concealed by other information displayed on the screen is much reduced. Personal landmarks are necessarily familiar to that user. In contrast, even a famous landmark may not be helpful to the user if he or she is new to the area. The famous landmark may also not be helpful if it is considered famous for a particular reason, e.g., as a popular sports facility or museum, which the user is not interested in. Thus, in many situations personal landmarks may be preferred, especially when they can readily orient the user in relation to the place of interest due to proximity (e.g., within 1-4 blocks, less than 1 km away, etc.). In such instances, personalized landmarks can reduce the number of turn-by-turn directions down to a few simple steps, or it may not even be necessary to provide turn-by-turn directions at all. These and other aspects of the technology are further described below.

Example Arrangement

FIG. 1 illustrates an example arrangement 100 in which different client devices 102, e.g., laptop 100₁, tablet 100₂, mobile phone 100₃, smartwatch 100₄ and desktop PC 100₅ may request content or other information from server 104 via communication system 110. However, other types of client devices may also be employed. Any such client device may send requests and receive query results from the server 104 as discussed herein. The server 104 may be coupled to one or more databases 106 via link 108. The database(s) may include a query database to respond to search requests from a user, a mapping database to generate map information relevant to a location of the user's device, a geolocation database used to determine the location of the user's device, or other types of databases.

By way of example only, queries received from a client device may be analyzed and routed to a service managed by the server. The service may be a query response service. While one server is shown, the functionality of the service may be performed by one or more server devices or other computer systems, such as a cloud computing network. The database(s) may be used by the service to identify a location and results relevant to the query, and map information for a region of interest including the location and results.

Figure 2A:
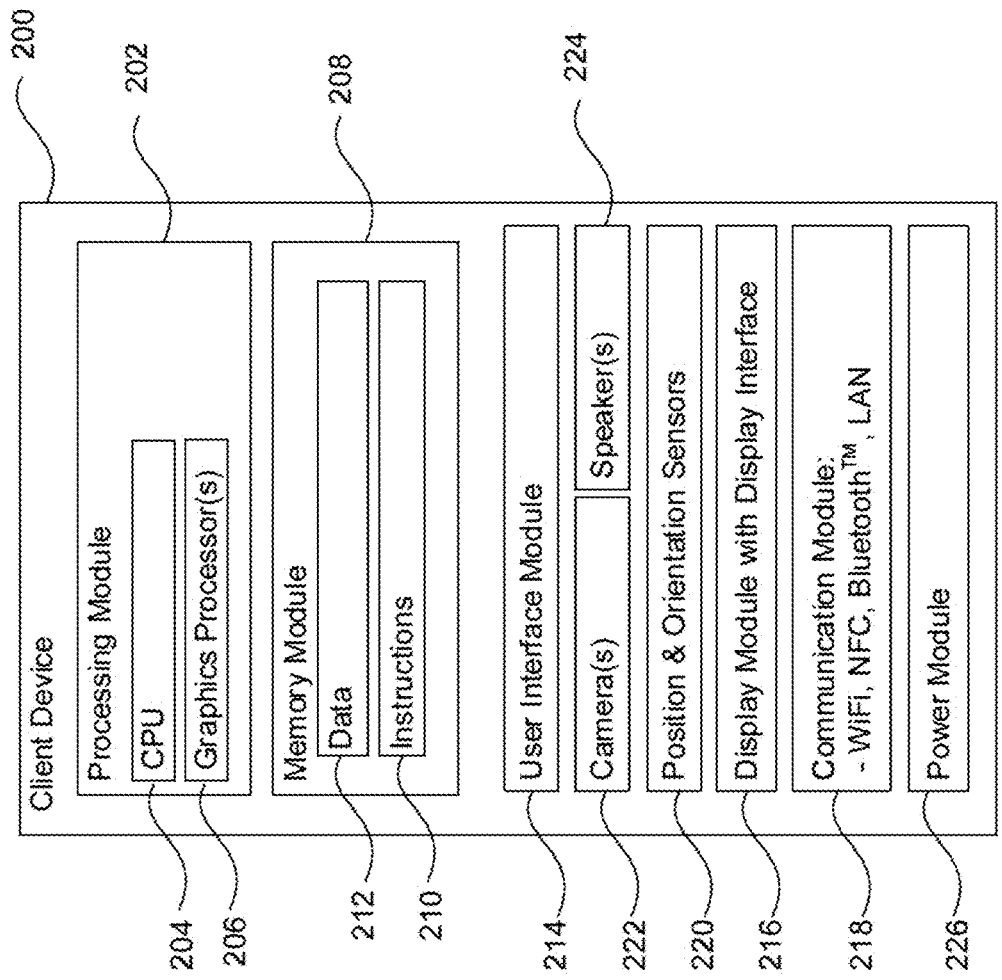
FIG. 2A is an example mobile client device configured in accordance with aspects of the disclosure.

FIG. 2A illustrates an example client device 200 that may be employed with the techniques disclosed herein. As shown, the client device 200 includes a processing module 202 having one or more computer processors such as a central processing unit 204 and/or graphics processors 206, as well as memory module 208 configured to store instructions 210 and data 212. The processors may or may not operate in parallel, and may include ASICs, controllers and other types of hardware circuitry. The processors are configured to receive information from a user through user interface module 214, and to present information to the user on a display device of the display module 216 having a display interface.

User interface module 214 may receive commands from a user via user inputs and convert them for submission to a given processor. The user inputs may include one or more of a touch screen, keypad, mouse, stylus, microphone, or other types of input devices. The display module 216 may comprise appropriate circuitry for driving the display device to present graphical and other information to the user. By way of example, the graphical information such as map details may be generated by the graphics processor(s) 206, while CPU 204 manages overall operation of the client device 200. The graphical information may display responses to user queries on the display module 216. For instance, the processing module may run a browser application or other service using instructions and data stored in memory module 208, and present information associated with the browser application or other service to the user via the display module 216.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively the memory module 208 may also include DVDs, CD-ROMs, high-density tape drives, and other types of write-capable or read-only memories. In one implementation, a computer program product is tangibly embodied in an information carrier. The computer program product contains instructions, such as instructions 210 that, when executed by one or more processors, perform one or more methods such as those described herein. The information carrier is a computer- or machine-readable medium, such as memory module 208. Although FIG. 2A functionally illustrates the processor(s), memory module, and other elements of device 200 as being within the same overall block, such components may or may not be stored within the same physical housing. For example, some or all of the instructions and data may be stored on an information carrier that is a removable storage medium (e.g., optical drive, high-density tape drive or USB drive) and others stored within a read-only computer chip.

The data 212 may be retrieved, stored or modified by the processors in accordance with the instructions 210. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 210 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance. Functions, methods and routines of the instructions are explained in more detail below.

As also shown in FIG. 2A, the mobile client device 200 includes a communication module 218 for communicating with other devices and systems. The communication module 218 includes a wireless transceiver; alternatively, the module may include a wired transceiver in addition to or in place of the wireless transceiver. The client device 200 may communicate with other remote devices via the communication module 218 using various configurations and protocols, including short range communication protocols such as near-field communication, Bluetooth™, Bluetooth™ Low Energy (LE), or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the client device 200 as shown may include one or more position and orientation sensors 220. The position and orientation sensors 220 are configured to determine the position and orientation of client device 200. For example, these components may include a GPS receiver to determine the device's latitude, longitude and/or altitude as well as an accelerometer, gyroscope or other direction/speed detection device. The client device 200 may also include one or more camera(s) 222 for capturing still images and recording video streams, one or more speaker(s) 224 and a power module 226, as well as actuators (not shown) to provide tactile feedback or other information to the user. Such tactile feedback can be used when directing the user to a place of interest via a route that includes one or more personalized landmarks, as discussed below.

Figure 2B:
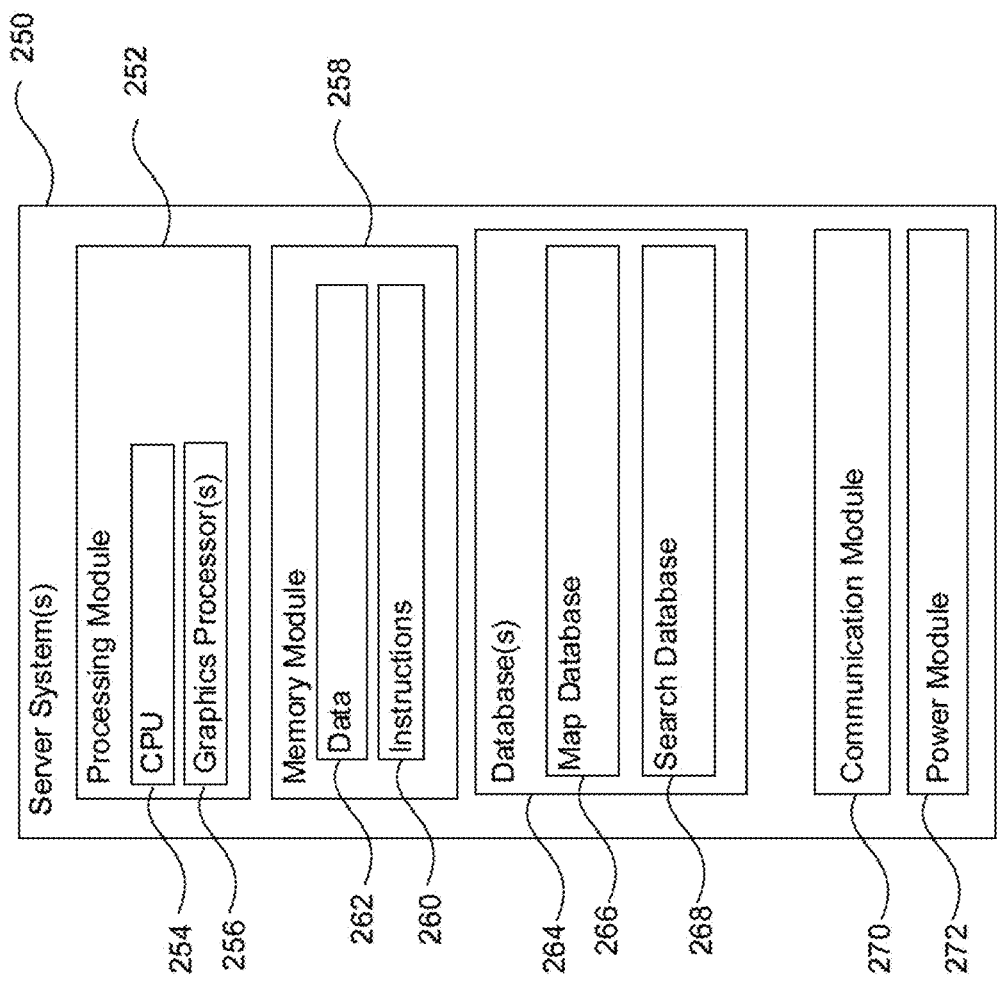
FIG. 2B is an example server system in accordance with aspects of the disclosure.

FIG. 2B illustrates an example server system 250 that may be employed with the techniques disclosed herein. As shown, the server system 250 includes various components similar to those described above for the mobile client device 200. For instance, server device includes a processing module 252 having one or more computer processors such as a central processing unit 254 and/or graphics processors 256, as well as memory module 258 configured to store instructions 260 and data 262. The processors may or may not operate in parallel, and may include ASICs, controllers and other types of hardware circuitry.

As with memory module 208, memory module 258 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively the memory module 258 may also include DVDs, CD-ROMs, high-density tape drives, and other types of write-capable or read-only memories. In one implementation, a computer program product is tangibly embodied in an information carrier. The computer program product contains instructions, such as instructions 260 that, when executed by one or more processors, perform one or more methods such as those described herein. The information carrier is a computer- or machine-readable medium, such as memory module 208. Although FIG. 2B functionally illustrates the processor(s), memory module, and other elements of server system 250 as being within the same overall block, such components may or may not be stored within the same physical housing. For example, some or all of the instructions and data may be stored on an information carrier that is a removable storage medium (e.g., optical drive, high-density tape drive or USB drive) and others stored within a read-only computer chip.

The data 262 of memory module 258 may be retrieved, stored or modified by the processors in accordance with the instructions 260. For instance, although the claimed subject matter is not limited by any particular data structure, the data may be stored in computing device registers, in a relational database as a table having a plurality of different fields and records, XML documents or flat files. The data may also be formatted in any computing device-readable format. As with instructions 210, the instructions 260 may be any set of instructions to be executed directly (such as machine code) or indirectly (such as scripts) by the processor(s), and the above discussion of instructions 210 applies to instructions 260 as well.

By way of example, the processors of the processing module 252 may be arranged in a distributed architecture. In a distributed architecture, the server system 250 may comprise multiple server units, for instance in a cloud computing arrangement. Whether in an inclusive or distributed architecture, the processors are operatively coupled to database(s) 264. In one example, the databases 264 include a map database 266 that has geolocation data about specific physical locations in different areas of interest. The database 264 may also include a search database 268 in order to respond to queries from various client devices. While the database 264 is shown as including both the map database 266 and the search database 268, such information may be stored in multiple discrete databases. The databases may be distributed, for instance across multiple memory modules or other storage devices of a cloud computing architecture.

As also shown in FIG. 2B, the server system 250 includes a communication module 270 for communicating with other devices and systems, including with client devices and other elements in the network. The communication module 270 may include a wireless transceiver. The communication module 270 may also include a wired transceiver in addition to or in place of the wireless transceiver. The server system 250 may communicate with other remote devices via the communication module 270 using various configurations and protocols, including short range communication protocols such as near-field communication, Bluetooth™, Bluetooth™ Low Energy (LE), or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the server system 250 as shown includes a power module 272. Other system elements, including computer components shown in FIG. 2A, may also be included within the server system 250.

Example Methods and Use Cases

As noted above, features of the technology can be implemented in different use cases. Examples of certain use cases are discussed below, although the technology may be employed in other situations and is not limited to those expressly provided herein. For different use cases, the user may request information via a mobile app or service on his or her client device. The requested information could be places in a particular area, such as restaurants, coffee shops, gas stations, museums, etc. Other situations may involve map or navigation-related queries. The provided results, location or direction information, or any combination thereof, may incorporate personalized landmarks to provide helpful contextual information to the user.

Figure 3B:
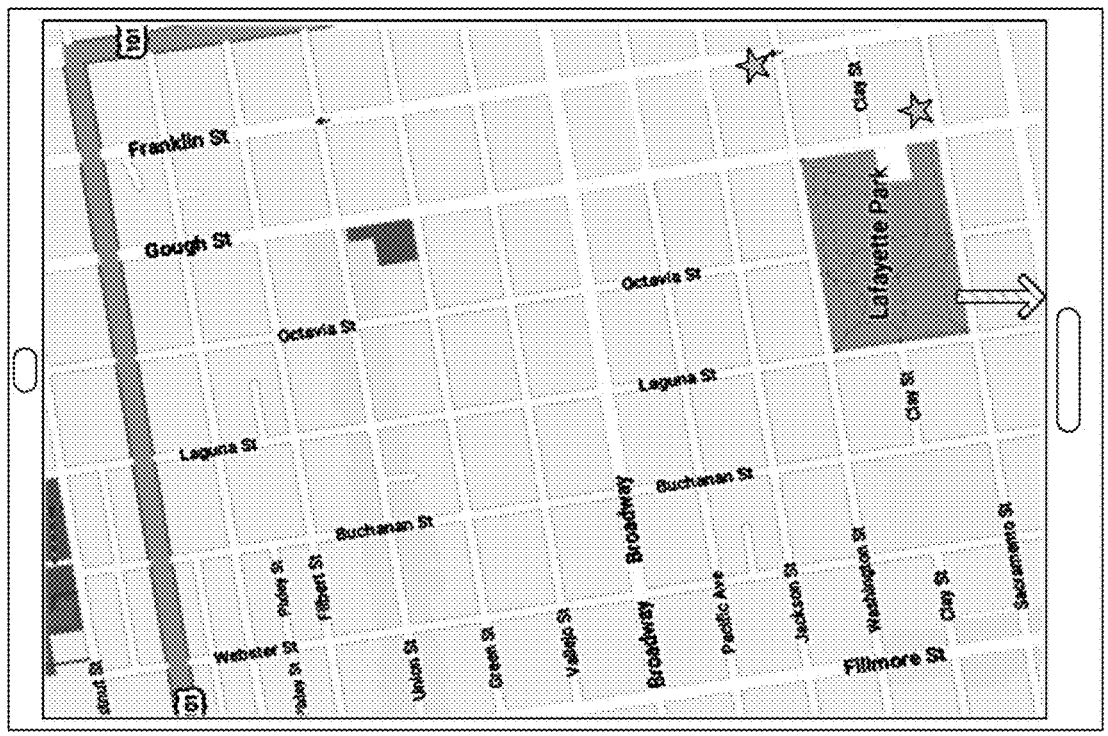
FIGS. 3A-C illustrate a mapping scenario in accordance with aspects of the disclosure.
Figure 3A:
Figure 3C:
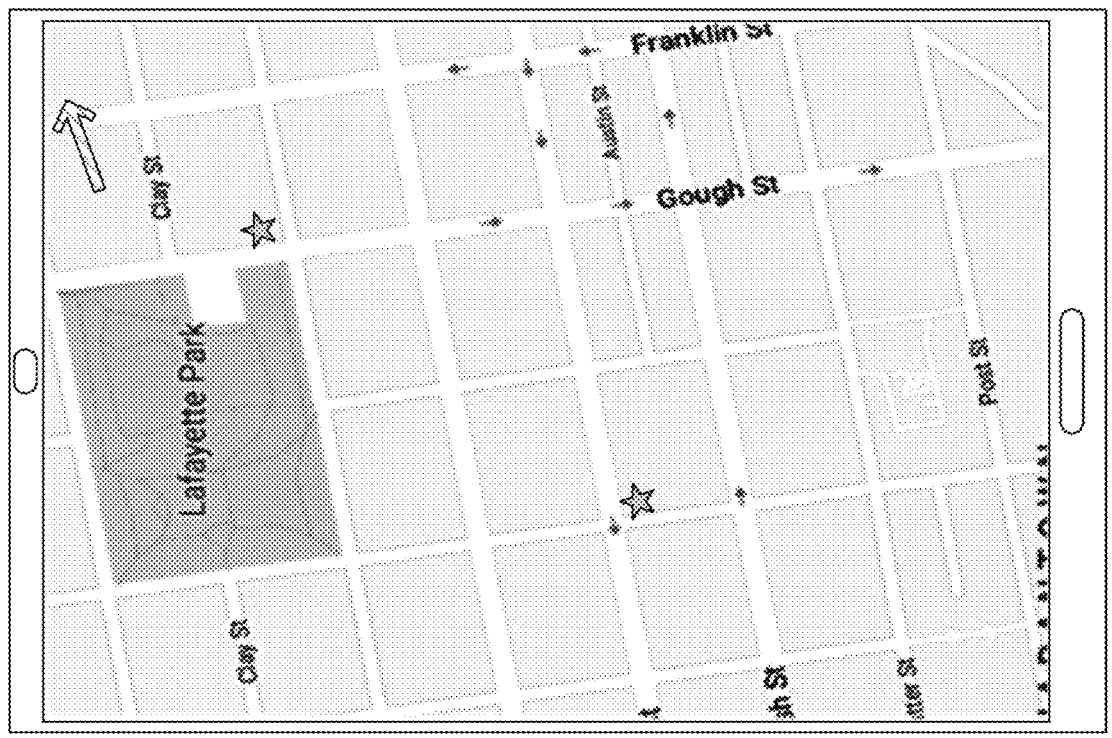

One type of use case involves browsing a map. The user may pan the map and/or zoom in or out of the map displayed in the viewport 302 on the display screen of the client device 300, as shown in FIGS. 3A-C. For instance, the user may view a map 304 of a northern section of San Francisco (FIG. 3A), pan south and zoom in (FIG. 3B), and then focus on a place of interest, such as Lafayette Park (FIG. 3C).

In this situation, the locations of personally familiar areas or points of interest (e.g., often-visited stores, restaurants, museums or residences) can be highlighted or otherwise emphasized in the current viewport. This helps the user orient him/herself to the map, and could be done in combination or in place of other map markers such as famous landmarks or paid advertiser elements. For example, as shown in FIG. 3A, a personalized landmark 306 is illustrated in the bottom right corner of the viewport. In addition, an arrow 308 may optionally be presented to indicate that one or more other personalized landmarks are off-map. As the map displayed in the viewport is panned or zoomed in response to user requests or actions (e.g., by manipulating a graphical interface or physically moving, angling or reorienting the client device), such as in FIG. 3B, different or additional personalized landmarks may appear, for instance to the right of Lafayette Park. Here, the arrow may indicate the direction of the personalized landmark from FIG. 3A, which is now off-map due to panning and zooming in the viewport. And FIG. 3C illustrates a further zoomed in map within the display port, in which personalized landmarks from FIGS. 3A and 3B are visible.

Figure 4:
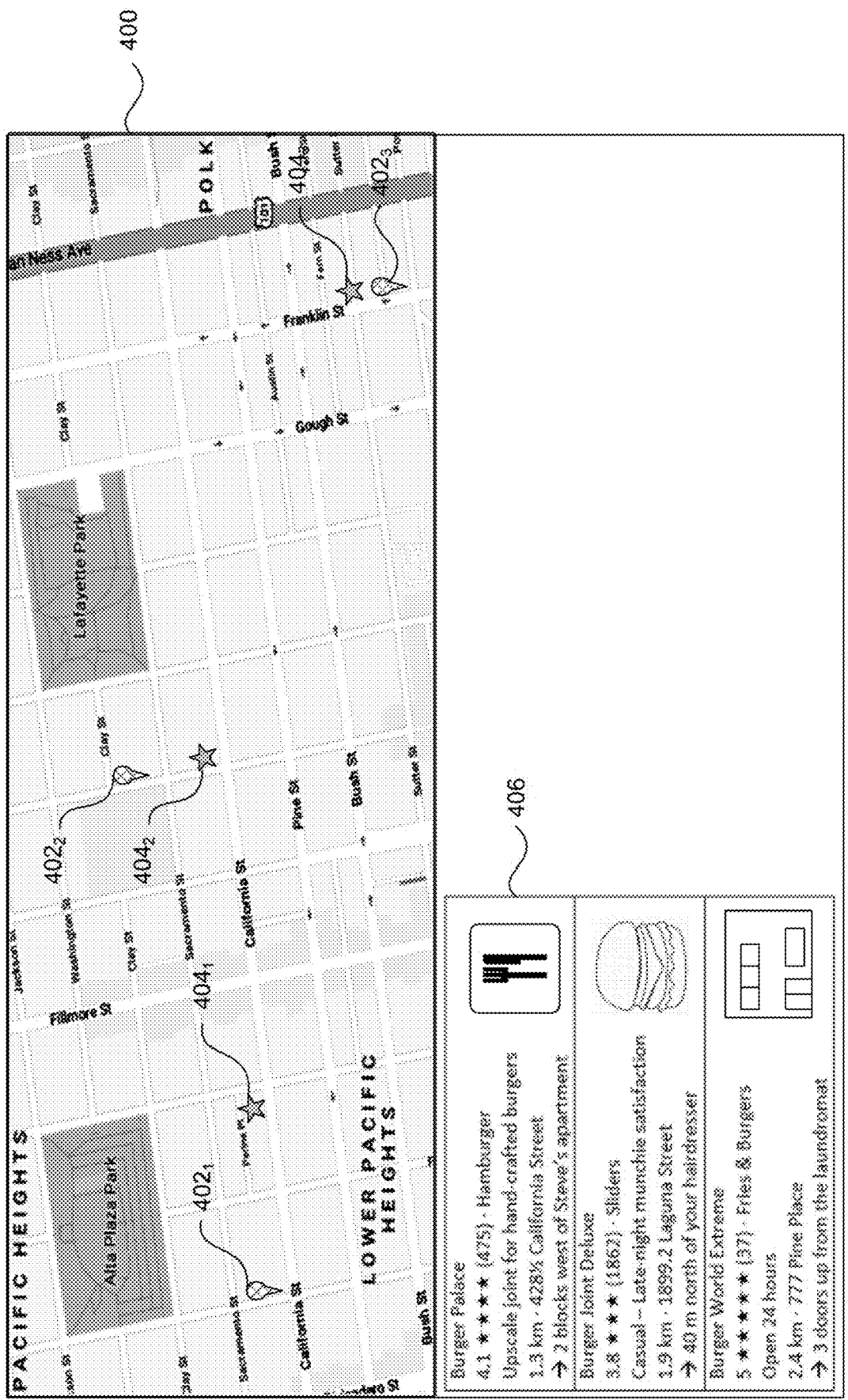
FIG. 4 illustrates a graphical display with search results in accordance with aspects of the disclosure.

Another use case involves the presentation of addresses, for instance as part of a set of search results. In one example, the user submits a query for burger restaurants. The client device may format the query and transmit it to a remote server (e.g., server 104 in FIG. 1). In this case, the server parses the query and any client device-related location information, using this information to identify and select relevant search results. The results are then transmitted back to the client device, formatted to conform with the features or limitations of the client device (e.g., a size, resolution or color capabilities of a display device) and then presented in a viewport 400 of the client device display, as shown in the example of FIG. 4. In particular, a set of results 402 may be illustrated on the map in the viewport as pushpins 402 or other indicators. In this example, pushpins $402_1$, $402_2$ and $402_3$ represent locations of the burger restaurants identified in list 406, which may be presented, e.g., below, to the side of, or above the viewport 400. Also shown on the map in the viewport are one or more personalized landmarks 404. Here, three personalized landmarks $404_1$, $404_2$ and $404_3$ are shown as stars on the map, although other indicators may be employed.

For address results, the system is configured to provide a hint based on one or more of the personalized landmarks. Thus, if multiple burger restaurants are returned as results within the viewport presented on the display, one or more of those restaurant results could be annotated with the closest personalized landmark. In this example, Burger Palace may correspond to pushpin $402_1$, and personalized landmark "Steve's apartment" $404_1$ nearby. The listed result indicates that Burger Palace is 2 blocks west of Steve's apartment. Similarly, Burger Joint Deluxe may correspond to pushpin $402_2$, and personalized landmark "hairdresser" $404_2$ is nearby. The listed result indicates that Burger Joint Deluxe is 40 meters north of the user's hairdresser. And Burger World Extreme may correspond to pushpin $402_3$, with "laundromat" $404_3$ being the personalized landmark of interest. The result for Burger World Extreme indicates that it is three doors up from the laundromat. Since the user already knows the location of each personalized landmark, more specific information about where to find the search results is not needed. This can significantly simplify the user interface, e.g., by reducing on-screen clutter, and provide much more personally relevant and meaningful information to the user.

With regard to navigation, personalized landmarks can be used to guide the user to the destination, for instance which may be one of the search results provided in response to a query. Here, the user may know how to get relatively close without directions, but need help with the "last mile" (or last few blocks) where the search result or other place of interest is located. Creating icons or otherwise highlighting the personalized landmark on the displayed map within the viewport will help the user, for instance by explaining or illustrating the point of interest in relation to the personalized landmark.

Figure 5B:
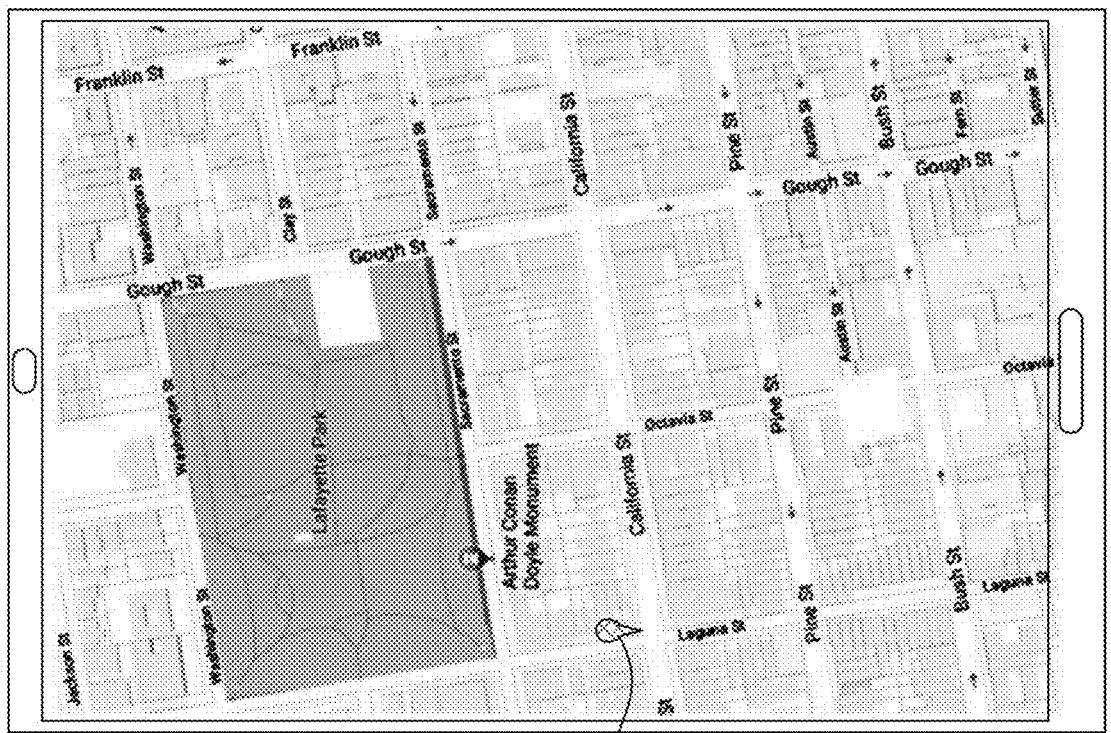
FIGS. 5A-D illustrate an example of providing personalized directions in accordance with aspects of the disclosure.
Figure 5A:
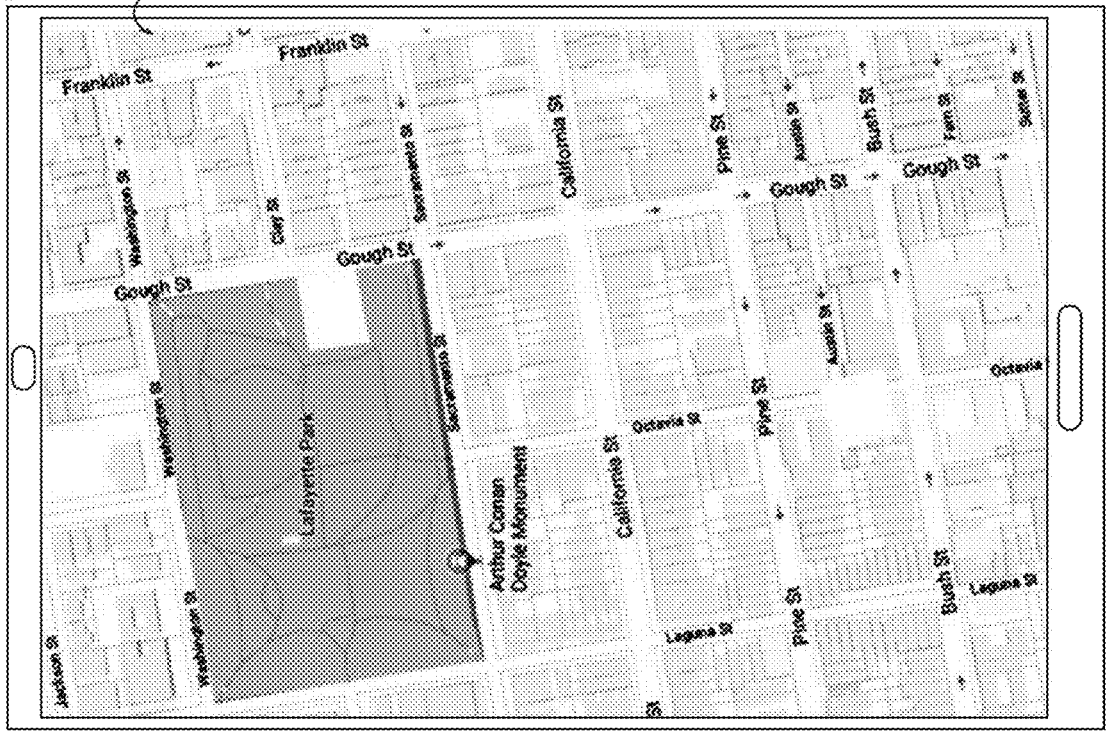
Figures 5C, 5D:
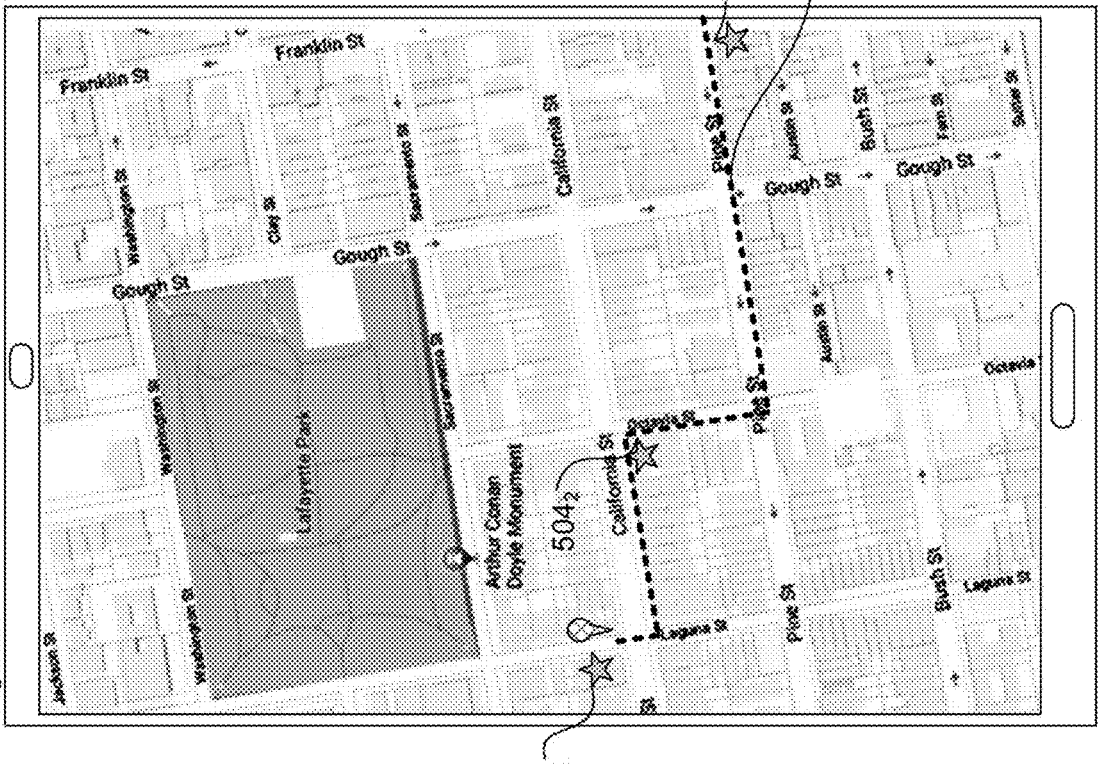

FIGS. 5A-D provide one such navigation example. FIG. 5A illustrates a viewport 500 presenting a portion of a map of San Francisco, Calif. FIG. 5B illustrates pushpin 502 on the map. The pushpin may indicate a search result, desired destination or other place of interest. One or more personalized landmarks 504 (FIG. 5C) will also be presented as part of the navigation. For example, FIG. 5C illustrates the map with the pushpin, as well as several personalized landmarks 504. FIG. 5C also illustrates a dashed path 506, which may be used to illustrate driving or walking directions. FIG. 5D presents exemplary directions associated with the personalized landmarks. Here, the directions may include directing the user past "Extreme Kobe Burger", which may be personalized landmark $504_1$. The directions may then guide the user to make a left turn at "Uncle Jim's", which may be personalized landmark $504_2$. Then the destination may be presented as being across from the user's "barber shop", which may be personalized landmark $504_3$. While 3 personalized landmarks are provided in this example, more or fewer may be presented. For instance, the number of personalized landmarks displayed can depend on the number of personalized landmarks identified by the system as being in (or adjacent) the current viewport.

The physical proximity or line-of-sight between a personalized landmark and the place of interest may also factor into the number of landmarks displayed, and which particular landmarks are selected. By way of example, personalized landmarks may be analyzed to determine if they are within a maximum number of feet or meters (e.g., between 30-75 meters, not more than 200 meters, on the order of 10-500 meters). The acceptable maximum distance may be varied due to a line-of-sight restriction. For instance, if a first personalized landmark is 85 meters from the place of interest but there is a clear line of sight between them, then that first landmark may be selected over a second personalized landmark that is 45 meters from the place of interest but is obscured by a building or other structure. The number of personalized landmarks may also be selected by the system to reduce screen clutter or information overload, especially when considering the form factor of the client device and the parameters of the display screen.

In these use cases and other scenarios, how the personally familiar objects are highlighted as personalized landmarks could be done in different ways. One preference is to avoid unnecessarily cluttering the map. This guiding principal may be especially relevant for small form factor client devices, such as mobile phones or smartwatches, which necessarily have small displays and correspondingly small viewports for the maps. A ranking system may be employed to help decide which entities or other elements to show on the base map, e.g., map 304 in FIG. 3A. For example, places of interest with high ratings and/or lots of visits (e.g. physical and/or online), etc., may be ranked more highly than place of interest with lower ratings and/or relatively fewer visits. The more highly ranked places of interest are, therefore, more likely to show up, and to show up earlier, than places of interest with low or no ratings, few visits, and little information.

According to one aspect, the system would introduce the user's familiarity with the place(s) of interest to boost the signal of a given point of interest and make it appear more prominently and/or displayed earlier on the map. In one instance, the actual representation on the map could be the same as existing places of interest. Alternatively, additional treatments such as bold text or specific iconography or colors could be employed to emphasize the relevance of the familiar place. This could include user-selectable icons, textual notes or images of the familiar place.

By way of example, the client device could provide an address hint to the user. Here, the system may choose via an input to the client device the most relevant personalized landmark and use that. For map highlighting, the system could similarly pick only a few personalized landmarks that are readily visible in the viewport.

The personalized landmarks may be used as a ranking signal to return relevant search results to the user. This provides an enhancement that not only allows the remote server to obtain useful results, but it may also reduce the amount of user queries and hence the amount of data packets sent across the network. The result information can also identify streets or public transportation options to help the user efficiently get to a particular location. In addition to using personalized landmarks as ranking signals for search results, such landmarks may be prioritized over famous landmarks, sponsored elements (e.g., paid advertisements) and/or other layers of information that might be available for presentation on the display device.

Personalized landmarks are focused on providing relevant contextual information for a given user. As such, in the instance where the user consents to the use of stored information such as prior location visits, calendar entries, invitations and the like, the data may be analyzed to generate personalized landmarks. Such data may not be tethered to the identity of individual users. In addition, personalized landmarks may be generated or presented in a manner that does not indicate an exact location or address. Here, the system may "fuzz" certain landmark information in order to generalize the location by indicating the street address of the building rather than a specific suite or floor within the building, by referencing a different store or place of business within the building, or a point of interest across the street that the user is likely to know. In other situations, the system may selectively omit certain kinds of businesses or places from being highlighted or otherwise identified as personalized landmarks (e.g., medical facilities, homes or apartments, etc.)

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user. Thus, the user may have control over what information is collected about the user, how that information is used, and what information is provided to the user.

Figure 6:
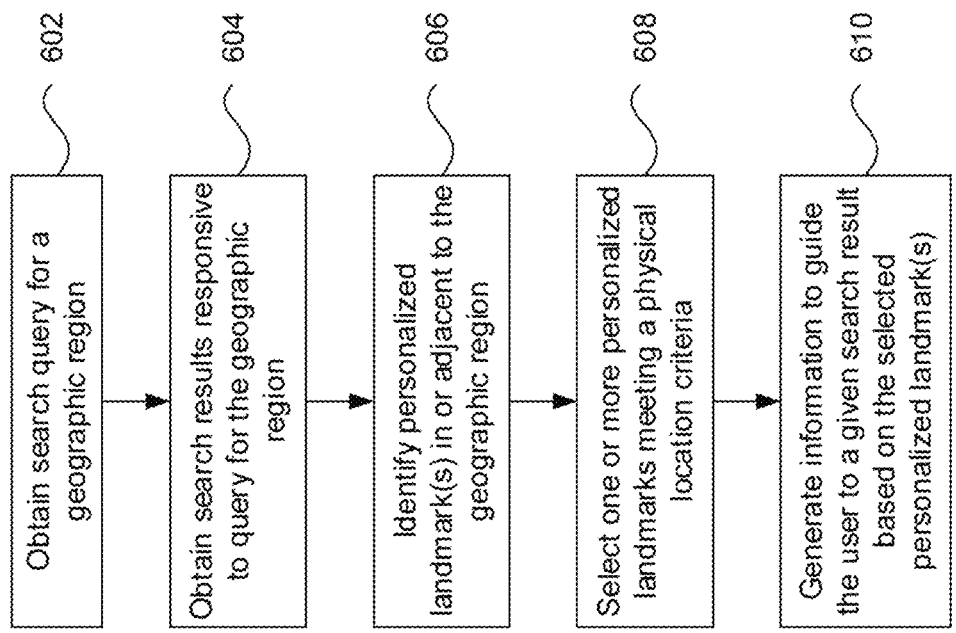
FIG. 6 illustrates a process for identifying and using personalized landmarks in accordance with aspects of the disclosure.

One example scenario is shown in relation to flow diagram 600 of FIG. 6. Here, in block 602 a search query is obtained for a given geographic region. The search query may be, e.g., in response to a request from a user of a client device for a type of business, restaurant, museum, etc. Alternatively the search query may be for a particular business, address or other place of interest. The search query may also include selection of a link in an email, address book or browser page, where the link is associated with a place of interest. These are non-limiting examples of types of search queries that can be received, for instance that are obtained by the client device or are received at a remote server.

In block 604, one or more search results are obtained in response to the search request. The search results correspond to one or more places of interest in the given geographical region. At block 606, one or more personalized landmarks are identified that are in or possibly adjacent to the given geographical region. The personalized landmarks are associated with a user of the client device, which enables the personalized landmarks to provide helpful contextual information regarding the location of the search result(s). The personalized landmarks may be identified prior or in response to obtaining the search query. For instance, depending on a current viewport for a map displayed on a display screen of the client device, the processor(s) of the client device may prospectively determine whether any personalized landmarks fall within the current viewport.

Then in block 608, one or more of the identified personalized landmarks are selected, for instance by one or more processors of the client device. The selection is based on one or more of physical proximity between a personalized landmark and the place of interest, line-of-sight between the personalized landmark and the place of interest, amount of prior visits to the personalized landmark, and ease of accessibility between the personalized landmark and the place of interest. The ease of accessibility may include evaluating whether the personalize landmark is on the same street or an adjacent street, but the street is a one-way street going in the wrong direction. The ease of accessibility may also include whether there is a sidewalk or on-street parking between the personalized landmark and the place of interest.

And at block 610, the system generates, for presentation by the client device, at least one of textual, audible or visual information to guide the user of the client device from the selected personalized landmark(s) to the given place of interest. This may include, but is not limited to, visually illustrating personalized landmarks in the viewport of a displayed map, highlighting or emphasizing such personalized landmarks, providing driving or walking directions based on the locations of the personalized landmarks, or otherwise indicating to the user a physical geographical relationship between the personalized landmarks and the place of interest.

The logic and process flows depicted in the figures and described herein are not limited to a particular order or sequence unless expressly stated. In addition, other steps may be provided, or steps may be eliminated, from the described flows, and other components may be added to, or removed from, the described systems.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented method, comprising:
obtaining, by one or more processors, a search request for a given geographical region in accordance with a client query at a client device;
obtaining, by the one or more processors, a set of two or more search results for the search request, each search result in the set of search results corresponding to a place of interest in the given geographical region;
identifying, by the one or more processors, a set of personalized landmarks in the given geographical region, the set of personalized landmarks being personally familiar areas or personally familiar points of interest of a user, wherein identifying the set of personalized landmarks includes determining the user visited the personally familiar areas or personally familiar points of interest a minimum number of times within a predetermined timeframe;
qualifying, by the one or more processors, for each search result in the set of search results and from the set of personalized landmarks, one or more of the personalized landmarks that meet a physical location criteria, wherein a qualified landmark meets the physical location criteria comprising a line of sight between the respective personalized landmark and the place of interest corresponding to the search result;
selecting, by the one or more processors, for each search result in the set of search results, a personalized landmark from the qualified personalized landmarks; and
generating, for each search result in the set of search results, by the one or more processors for presentation by the client device, visual information to guide the user of the client device from the respective selected personalized landmark to the place of interest corresponding to the search result.

2. The computer-implemented method of claim 1, wherein each personalized landmark in the set of personalized landmarks is at a respective geographical locations previously visited by the user.

3. The computer-implemented method of claim 2, wherein determining the user visited the personally familiar areas or personally familiar points of interest includes identifying associations between the user and the personally familiar areas or personally familiar points of interest based on data stored in computer memory, the data comprising location history of the user.

4. The computer-implemented method of claim 1, wherein the physical location criteria further comprises a predetermined physical distance.

5. The computer-implemented method of claim 1, wherein generating the visual information includes fuzzing information about the selected personalized landmarks.

6. The computer-implemented method of claim 1, further comprising applying data identifying the selected personalized landmarks as a ranking signal to select a subset of search results to present in response to the search request.

7. The computer-implemented method of claim 1, wherein determining the set of personalized landmarks is performed prior to obtaining the search request.

8. The computer-implemented method of claim 1, wherein the selected personalized landmarks are further selected based on one or more of an amount of prior visits to a particular personalized landmark, and an ease of accessibility between the particular personalized landmark and the place of interest.

9. The computer-implemented method of claim 1, wherein the visual information is other, non-textual, visual information.

10. A system comprising:
one or more processors; and
memory storing instructions that, when executed by the one or more processors, cause the system to:
obtain a search request for a given geographical region in accordance with a client query at a client device;
obtain a set of two or more search results for the search request, each search results in the set of search results corresponding to a place of interest in the given geographical region;
identify a set of personalized landmarks in the given geographical region, the set of personalized landmarks being personally familiar areas or personally familiar points of interest of a user, wherein identifying the set of personalized landmarks includes determining the user visited the personally familiar areas or personally familiar points of interest a minimum number of times within a predetermined timeframe;
qualify, for each search result in the set of search results and from the set of personalized landmarks, one or more of the personalized landmarks that meet a physical location criteria, wherein a qualified landmark meets the physical location criteria comprising a line of sight between the respective personalized landmark and the places of interest corresponding to the search result;
select, for each search result in the set of search results, a personalized landmarks from the qualified personalized landmarks; and
generate, for each search result in the set of search results, for presentation by the client device, visual information to guide the user of the client device from the respective selected landmark to the places of interest corresponding to the search result.

11. The system of claim 10, wherein the physical location criteria further includes a predetermined physical distance.

12. A non-transitory computer-readable recording medium having instructions stored thereon, the instructions, when executed by one or more processors, cause the one or more processors to:
obtain a search request for a given geographical region in accordance with a client query at a client device;
obtain a set of two or more search results for the search request, each search result in the set of search results corresponding to a place of interest in the given geographical region;
identify a set of personalized landmarks in the given geographical region, the set of personalized landmarks being personally familiar areas or personally familiar points of interest of a user, wherein identifying the set of personalized landmarks includes determining the user visited the personally familiar areas or personally familiar points of interest a minimum number of times within a predetermined timeframe;
qualify, for each search result in the set of search results and from the set of personalized landmarks, one or more of the personalized landmarks that meet a physical location criteria, wherein a qualified landmark meets the physical location criteria comprising a line of sight between the respective personalized landmark and the place of interest corresponding to the search result;
select, for each search result in the set of search results, a personalized landmark from the qualified personalized landmarks; and
generate, for each search result in the set of search results, for presentation by the client device, visual information to guide the user of the client device from the respective selected landmark to the place of interest corresponding to the search result.

13. The non-transitory computer-readable recording medium of claim 12, wherein the physical location criteria further includes a predetermined physical distance.

* * * * *